(12) United States Patent
Baleriaux et al.

(10) Patent No.: US 10,737,272 B2
(45) Date of Patent: Aug. 11, 2020

(54) CONNECTION SYSTEM

(71) Applicant: ASEPTIC TECHNOLOGIES S.A., Les Isnes (BE)

(72) Inventors: Patrick Baleriaux, Nalinnes (BE); Eric Aelgoet, Nivelles (BE)

(73) Assignee: ASEPTIC TECHNOLOGIES S.A., Les Isnes (BE)

(*) Notice: Subject to any disclaimer, the term of this patent is extended or adjusted under 35 U.S.C. 154(b) by 606 days.

(21) Appl. No.: 15/430,588

(22) Filed: Feb. 13, 2017

(65) Prior Publication Data
US 2017/0239660 A1 Aug. 24, 2017

(30) Foreign Application Priority Data
Feb. 18, 2016 (BE) .................... 2016/5117

(51) Int. Cl.
| B01L 1/00 | (2006.01) |
| G21F 7/005 | (2006.01) |
| G21F 7/047 | (2006.01) |
| A61J 1/00 | (2006.01) |
| B01L 3/00 | (2006.01) |
| G01N 1/22 | (2006.01) |
| B25J 21/02 | (2006.01) |
| E05B 65/00 | (2006.01) |
| B25J 21/00 | (2006.01) |

(52) U.S. Cl.
CPC ............ *B01L 3/563* (2013.01); *A61J 1/00* (2013.01); *B01L 1/00* (2013.01); *B25J 21/02* (2013.01); *E05B 65/00* (2013.01); *G01N 1/2226* (2013.01); *G21F 7/005* (2013.01); *G21F 7/047* (2013.01); *B01L 2200/025* (2013.01); *B01L 2200/026* (2013.01); *B01L 2200/0689* (2013.01); *B01L 2200/12* (2013.01); *B01L 2200/141* (2013.01); *B01L 2300/087* (2013.01); *B01L 2300/0848* (2013.01)

(58) Field of Classification Search
USPC ........................................................ 422/544
See application file for complete search history.

(56) References Cited

U.S. PATENT DOCUMENTS

| 2004/0020129 A1* | 2/2004 | Thilly ................ G21F 7/005 49/381 |
| 2011/0256021 A1* | 10/2011 | Adams ................ A61L 2/07 422/28 |
| 2012/0085182 A1* | 4/2012 | Untch ................ F16K 5/0626 73/863.86 |
| 2014/0345748 A1* | 11/2014 | Rogers ................ B01L 1/02 141/311 R |
| 2015/0276069 A1* | 10/2015 | Saragosa ............. G01N 1/22 251/304 |

* cited by examiner

*Primary Examiner* — Jill A Warden
*Assistant Examiner* — Brittany I Fisher
(74) *Attorney, Agent, or Firm* — Patrick J. Daugherty; Daugherty & Del Zoppo Co., LPA

(57) ABSTRACT

The invention relates to a connection system for connecting an inside environment of a compartment to an environment outside said compartment, said compartment being isolated relative to the outside environment and said connection system, said connection system comprising a blocking device.

14 Claims, 10 Drawing Sheets

CONNECTION SYSTEM

The present invention relates to a connection system for connecting an inside environment of a compartment to an environment outside said compartment, said compartment being isolated relative to the outside environment and the connection system comprising:

- a connecting wall to separate said inside environment from said outside environment, said connecting wall having a communication orifice arranged to receive a through connecting element having a main body on which a case is removably mounted, and
- a removable closing device inside said compartment arranged to tightly seal said the communication orifice of said compartment, arranged to be able to be coupled separately with said case mounted on said main body of said connecting element and arranged such that, when it is removed from the inside of the compartment, it allows a simultaneous removal of said case by separating it from said main body of said connecting element.

"Compartment being isolated" or "isolated compartment" means, within the meaning of the present invention, that the compartment is tightly or quasi-tightly isolated to prevent any contamination related to the presence of germs, bacteria, chemical particles, inert particles or any other contaminant. This isolation makes it possible to avoid contamination between environments having different environmental conditions, more particularly between the inside environment of the compartment and the outside environment of the compartment, the contaminants being able to be found either in the inside environment of the compartment, or in the outside environment of the compartment.

As an example, in the pharmaceutical industry, there are different types of environments that are classified as grade A, B, C, D, etc., grade A traditionally corresponding to the cleanest environmental classification grade. The cleaner the grade is, the stricter the standards are that govern the tolerance of the presence of contaminants, such as microorganisms, fine particles and dust. Traditionally, clean rooms in a GMP (Good Manufacturing Process) environment are aseptic rooms that have zones A, B, C and D through which the different substances pass that are intended to become pharmaceutical products. In this context, grade A corresponds to the final environment in which the injectable pharmaceutical products are distributed in the final containers, typically in tubes, blisters or vials after passing through filling needles. These tubes, blisters or vials are of course sterilized beforehand and treated so as to minimize their particle content. They are also inert with respect to the pharmaceutical product that they contain in that they release few or no particles or chemical compounds into the solution. In general, these containers must comply with very severe, strict standards to guarantee patient safety.

As a result, during the production method, the medium containing the substance intended to become a pharmaceutical product undergoes different steps such as purifications, filtrations or other transformations, which means that the substance goes from a zone with one particular grade to a zone with a higher grade, or from one container to another. These containers or zones have an outside environment and an inside environment, the outside environment being essentially less clean than the inside environment, or at least likely to be less clean. Thus, a pouch containing a substance intended to be distributed in grade A cannot itself be in grade A if it has previously been exposed to an environment with a lower grade, or since the outside of the pouch may be contaminated and therefore contaminate the inside environment of the grade A zone and, consequently, the pharmaceutical product itself.

Conversely, certain particularly active pharmaceutical products, such as antineoplastic products, for example, or certain biotechnology products using live viral vectors, require confining the distribution operations to an enclosed space in order to minimize the risk of contamination of the surrounding area, i.e., the environment outside the compartment.

Today, various solutions for transfers between zones with different grades or different contamination levels have been developed, which all aim to reduce the risk of contamination of a zone by the environmental state of another zone. As an example, for the aseptic filling of tubes, vials and blisters with pharmaceutical products, there are grade A "glove boxes" that contain the tubes, vials or blisters as well as filling needles. These "glove boxes" also comprise a communication orifice through which the content of a reservoir situated in an outside environment (potentially with a less clean grade) is transferred. This communication orifice is equipped with devices making it possible to minimize the risk of contamination by using connection elements that cooperate tightly with the communication orifice, without risking putting the pharmaceutical product to be transferred in contact with surfaces that may have been contaminated by exposure to an environment with a lower grade.

In this sense, a connection system as indicated earlier is known from document EP 1,312,096. More particularly, this collection system is described as aseptically seeing to the transfer of a fluid leaving a container situated in an environment with a given grade toward smaller containers present in an environment with a higher grade, the content of the containers having to be completely sterile. Such transfers are critical, in particular in pharmaceutical industries, where it is crucial for the packaging of large volumes of stock solutions into smaller volumes to be done without risking contaminating the solution to be distributed. To that end, the smaller containers are filled in a compartment aseptically isolated from the outside environment, the fluid for example being pumped from a pouch, passing through the tubing of the connection element, then being distributed into the smaller containers that are filled using an aseptic filling device.

During these operations, the connection element, connected at one of its ends to the container of the stock solution and at its other end (situated inside the sterile compartment) to an aseptic fluid filling device, plays a key role in that it constitutes the interface allowing the aseptic transfer of the fluid between the outside surrounding environment (which is typically, but not necessarily, less clean) and the environment inside the compartment. To ensure complete isolation between the inside environment of the compartment and the outside environment of the compartment, blocking means are provided so as to form a tight connection between the connecting element and the connecting wall, to prevent any contaminants from entering the compartment. This tight connection is provided by placing the rigid wall of the compartment, via the aforementioned blocking elements, in contact with the connecting element, which is also rigid, a flexible sealing gasket being able to be present between these two rigid elements in order to reinforce the tight nature of the connection.

Furthermore, prior document EP 1,312,096 describes a removable case that surrounds the part of the connecting element that enters the compartment. A removable closing device inside the compartment is also provided and cooperates with said case. The case and the removable closing device are arranged relative to one another such that no contaminants can compromise the sterility of the compartment where the filling of the small containers takes place. Indeed, the removable closing device confines any contaminants that may be present on the case between its inner wall and the outer wall of the case. When the removable closing device is removed, it is provided to drive the simultaneous removal of the case without any contaminant being able to reach the inside environment of the compartment inasmuch as the contaminants are confined between the outer wall of the case and the inner wall of the removable closing device.

With such a connection system, the interface between the outside environment and the higher-grade inside environment of the compartment is therefore made up on the one hand of the connecting wall, and on the other hand of the through connecting element that only fills in the communication orifice of this connecting wall. It is therefore essential for the connecting element to be maintained tightly at the communication orifice, failing which, if the communication orifice of this connection element is dropped or disengaged, outside contaminants could contaminate the inside environment of the compartment, or on the contrary, contaminants initially present in the compartment could reach the outside environment. In such a scenario, the entire device must be decontaminated again, which requires stopping the production chain in addition to losing the lot in use upon the fall or disengagement of the connection element.

Currently, as indicated above, in order to secure the positioning of the connecting element at the communication orifice of the compartment, it is provided, for example as in document EP 1,312,096, to have elements blocking this connecting element at the connecting wall on the outside environment side. Furthermore, when the connecting element, the main body of which is surrounded by a removable case, is engaged, via the communication orifice, in the inner removable closing device, the removable case is further retained by the latter. Consequently, before the removable closing device is removed to remove the case mounted on the main body from said connecting element, the latter is kept against the connecting wall of the connecting system on the one hand by the blocking elements at the connecting wall, and on the other hand, by the removable closing device. In this scenario, the connection system does not present any risk of disengagement of the connecting element leaving from the communication orifice of the connecting wall.

However, unfortunately, even if the connecting element is secured by the blocking element after it is inserted into the communication orifice and in the removable closing device inside the compartment, once this inner removable closing device is withdrawn to remove the case mounted on the main body of said connecting element, only the blocking elements at the connecting wall make it possible to ensure maintenance of the tight positioning of the connecting element against the connecting wall of the compartment. However, if, inadvertently or following a manipulation error, an operator deactivates the blocking provided by the blocking elements at the connecting wall when the removable closing device is no longer present, there is a high risk of the connecting element disengaging from the communication orifice and thereby allowing contaminants to reach the inside environment of the compartment or, conversely, for particles (for example, toxic particles) initially contained in the compartment to reach the environment outside the compartment. In other words, there is therefore a risk that without the inner removable closing device, the connecting element may be removed, in which case contaminations between separate environments may occur.

Another issue observed with the current connecting systems, for example with the connecting system as described in document EP 1,312,096, is that nothing prevents the inner removable device from being removed even if no connecting element is present at the communication orifice, or if said connecting element is present but is not secured by the blocking elements at the connecting wall. In this case, an inadvertent removal of the removable closing device inside the compartment would directly lead to a configuration in which the communication orifice would constitute a direct air passage between the outside environment and the inside environment of the compartment. Of course, this is completely unacceptable and violates the very principle of a connection system that must ensure a separation between two environments with different grades. In other words, there is therefore a risk that without a secure connecting element, the inner removable closing device may be removed, in which case contaminations between separate environments may also occur.

At this time, there is therefore a real need to procure a connecting system making it possible to thwart any manipulation error. In particular, on the one hand, there is a real need to procure a connecting system whereof the inner removable closing device cannot be removed as long as the connecting element is not secured at the connecting wall on the outside environment side. Furthermore, in parallel, there is a real need to procure a connection system for which the connecting element cannot be removed when the inner removable closing device is not tightly sealing the communication orifice of the compartment on the inside environment side of the compartment.

In other words, there is therefore a real need to procure a connection system making it possible to withstand any manipulation error that may occur after the connecting element is inserted, this manipulation error being able to occur both at the connecting wall on the outside environment side (for example, by inadvertently switching the position of the blocking elements) and at the removable closing device inside the compartment (for example by inadvertently disengaging the movable closing device at the wrong moment), in order to avoid any contamination between two separate environments. More particularly, as indicated above, a connection system should be provided continuously ensuring, after securing the connecting element, sealing between two separate environments, irrespective of the configuration of the connection system, i.e., whether or not the removable closing device is present at the connecting wall on the inside environment side.

To resolve this problem, according to the invention, a connection system is provided as indicated above, characterized in that it further comprises a blocking device, said blocking device comprising, at said connecting wall on the outside environment side, an element for controlling a blocking mechanism, said control element having a first open position to allow said connecting element to be inserted into said communication orifice and into said inner removable closing device and to control said blocking mechanism so that it blocks any movement by said inner removable blocking device, and a second closing position to block said connecting element received in said communication orifice at said connecting wall on the outer side and to allow said blocking mechanism to authorize a movement of said inner removable closing device, said blocking mechanism being arranged to
- block said control element in the closed position once a movement has been initiated to remove said inner removable closing device, and
- maintain said blocking movement of said control element in the closed position during a continuation of said movement to remove said inner removable closing device, up to and including its complete removal.

In the context of the present invention, it has been shown that such a connection system makes it possible to ensure continuously, after the connecting element has been secured at the connecting wall on the side of the environment outside the compartment, sealing between two separate environments, irrespective of the configuration of the connection system, i.e., whether or not the removable closing device is present at the connecting wall. In other words, the connection system according to the invention makes it possible, once the connecting element is secured at the connecting wall on the side of the environment outside the compartment, to avoid any removal (any release) of the connecting element as long as the removable closing device is not in place, i.e., placed sealably against the connecting wall inside the compartment.

Indeed, once a movement to remove said inner removable closing device is initiated, blocking of the control element securing the connecting element at the connecting wall on the outside environment side is done by the blocking mechanism. Consequently, since the control element is blocked, it is not possible to take it from its closed position to its open position, and it is therefore quite simply impossible, for example inadvertently, to release the connecting element. Therefore, once the connecting system may present a risk of transferring contamination between the inside and outside environment of the compartment, by removal of the inner removable closing device, according to the invention, it is provided that the connecting element is completely secured by not allowing the control element to leave its closing position, such that the sealing of the system is still provided by the connection element sealably blocked by the control element at the connecting wall on the outside environment side.

Furthermore, when the movement to remove said inner removable closing device is continued and the initial blocking provided by the blocking mechanism is no longer able to perform its function blocking the control element, the control element nevertheless continues to be maintained and blocked in its closed position by this same blocking mechanism according to a secondary blocking. For example, the control element cooperates with the blocking mechanism or positions itself relative to the latter so as to prevent any movement thereof to ensure that the control element is kept in its closed position.

Consequently, once the inner removable closing device is no longer able to ensure the sealing of the connection system, i.e., once its removal has been initiated in order to drive a removal of the removable case from the connecting element, the connection system according to the invention makes it possible to guarantee the sealing of the system by preventing any disengagement and/or removal of the connecting element, which then constitutes the only element able to ensure a sealed separation between the two environments. As indicated above, this sealing guarantee of the system when the inner removable closing device is removed is provided by blocking the control element in its closing position, the closing position itself ensuring blocking of the connection element.

According to one embodiment of the invention, said blocking mechanism of said blocking device comprises
- a first blocking element arranged to perform a first blocking of said control element in the closed position once a movement has been initiated to remove said inner removable closing device, and
- a second blocking element arranged to maintain said blocking movement of said control element in the closed position during a continuation of said movement to remove said inner removable closing device, up to and including its complete removal.

This embodiment according to the invention is more particularly explained and illustrated below using the figures, but is not a non-limiting embodiment of the present invention, any other appropriate blocking mechanism being covered by the present invention.

According to this embodiment, where first and second blocking elements are present, it may be considered that a first blocking of the control element takes place, followed by a second, subsequent blocking of this same control element, when the first blocking is no longer able to perform its blocking function. More particularly, the second subsequent blocking follows the first blocking before this first blocking is no longer effective. In other words, the second blocking directly takes over for the first blocking even before the latter is no longer able to perform its blocking function, and maintains the blocking function of the control element even when the inner removable closing device is completely separated from the connecting wall on the inner side of the compartment.

Preferably, the connection system according to the invention further comprises an additional blocking device arranged so as, in a first idle position, to ensure additional blocking for said inner removable closing device and prevent an insertion of said connecting element into said communication orifice, and so as, in a second position, to be pushed back to allow said connecting element to be inserted into said communication orifice and unblock said additional blocking of said inner removable closing device. In this scenario, a blocking of the inner removable closing device is still provided, even when the control element could be switched from its open position to its closed position following a manipulation error. This therefore involves additional security for the connection system according to the invention, the securing being obtained by the additional blocking device, which detects the presence of the connection element and only allows a movement of the removable closing device when this connection element is in place ("presence device-connection element").

Preferably, according to the invention, said control element is a mechanical control element assuming the form of a control button, optionally in the form of a rotating control button.

Advantageously, according to the invention, said first blocking element comprises a housing arranged to accommodate a cam, which is arranged to be actuated by said control element so as to impose a translational movement on said first blocking element. In other words, a passage of the control element from its open position to its closed position will drive a cam, which, by moving in the housing, will cause a translational movement of the first blocking element.

Preferably, according to the invention, said first blocking element further comprises a pivoting element having a free end rotating around an axis, said pivoting element being arranged to perform a rotational movement during a translational movement of said first blocking element.

Preferably, according to the invention, said second blocking element comprises a spring arranged to impose a return movement on it.

Preferably, according to the invention, said second blocking element has a solid part and a hollow part.

Advantageously, according to the invention, said second blocking element has a free end provided with a caster.

Other embodiments of the connection system according to the invention are indicated in the appended claims.

The invention also relates to an inner removable closing device of a connection system according to the invention, said inner removable closing device comprising
- a head part having a central through orifice, and
- a tubing extending from said head part in the extension of said central through orifice, said head part comprising, on its perimeter
- a protrusion situated at a first level,
- a ramp extending said protrusion, said ramp being situated at a second level lower than said first level, and
- a notch arranged to provide access to a slot, said slot being situated at a level lower than said second level.

As explained below with the help of the figures, these various elements of the inner removable closing device cooperate with the elements of the blocking device of the connection system according to the invention, in particular when the movement (for example rotational) of the inner removable closing device is done in order to remove it from the inside of the compartment or to reposition it at the connecting wall to the inside of the compartment.

Other embodiments of the removable closing device according to the invention are indicated in the appended claims.

The invention also relates to a method for connecting an inside environment of a compartment to an environment outside said compartment, said method comprising the following steps:
- inserting, via a communication orifice of a connecting wall separating said inner environment from said outer environment, a connecting element having a main body to allow it to be engaged in an inner removable closing device previously positioned and blocked so as to tightly seal said communication orifice,
- actuating a control element situated on the outside environment side to position it in the closing position in order to secure and block said connecting element against said connecting wall at said communication orifice and so as to unblock said inner removable closing device and allow a removal movement thereof,
- setting said inner removable closing device in motion to allow it to be removed from the inside of said compartment simultaneously with a removal of a case protecting said main body of said connecting element, said step for setting said inner removable closing device in motion leading to
- blocking said control element in its closed position via a blocking mechanism once said inner removable closing device begins a removal movement, and
- maintaining said blocking of said control element in the closed position via said blocking mechanism once said inner removable closing device continues a removal movement, up to and including its complete removal.

Advantageously, according to the method of the invention, said blocking of said control element in the closed position is done via a first blocking element of said blocking mechanism, one end of said first blocking element abutting against a protrusion of said inner removable closing device having begun its removal movement.

Preferably, according to the method of the invention, said blocking of said control element in the closed position is maintained via a second blocking element of said blocking mechanism, said second blocking element blocking said first blocking element.

Advantageously, the method according to the invention comprises an additional step for deactivating an additional blocking device from a first idle position to a second position, said additional blocking device being arranged to block said inner removable closing device in the absence of said connecting element.

Other embodiments of the method according to the invention are indicated in the appended claims.

The invention also relates to a use of a connection system according to the invention, to transfer a fluid or powder.

Other usage forms of a connection system according to the invention are indicated in the appended claims.

The invention also relates to a use of an inner removable closing device according to the invention, to transfer a fluid or powder.

Other usage forms of an inner removable closing device according to the invention are indicated in the appended claims.

Other features, details and advantages of the invention will emerge from the following description, provided non-limitingly and in reference to the appended drawings.

In the figures, identical or similar elements bear the same references.

According to one embodiment of the invention (as illustrated in the figures below), when the blocking mechanism comprises first and second blocking elements, it may be considered, as indicated above, that a first blocking of the control element takes place, followed by a second, subsequent blocking of this same control element, when the first blocking element is no longer able to perform its blocking function. According to this embodiment of the invention, said second blocking element subsequent to said control element in the closed position is obtained as follows during a movement (for example, rotational) done by the inner closing device to remove it from the inside of the compartment. During the blocking of said control element in the closed position, the inner closing device is freed (by passage of the control element from its open position to its closed position) and can rotate following the removal of one end of a first blocking element from a notch of the inner closing device (see the figures, and in particular FIG. 5). Once the inner closing device begins its rotational movement, a protrusion of this inner closing device is situated across from the retracted end of the first blocking element and therefore constitutes a stop for this element. Such a configuration therefore prevents any return movement of the first blocking element, and consequently ensures blocking of the control element in its closed position. Subsequently, when the inner closing device continues its removal (rotational) movement, the second blocking element comes into play such that it no longer allows any movement of the first blocking element, which results in preventing any movement of the control element, which remains in its closed position as explained above, even when the end of the first blocking element is no longer blocked by the stop.

Figure 1:
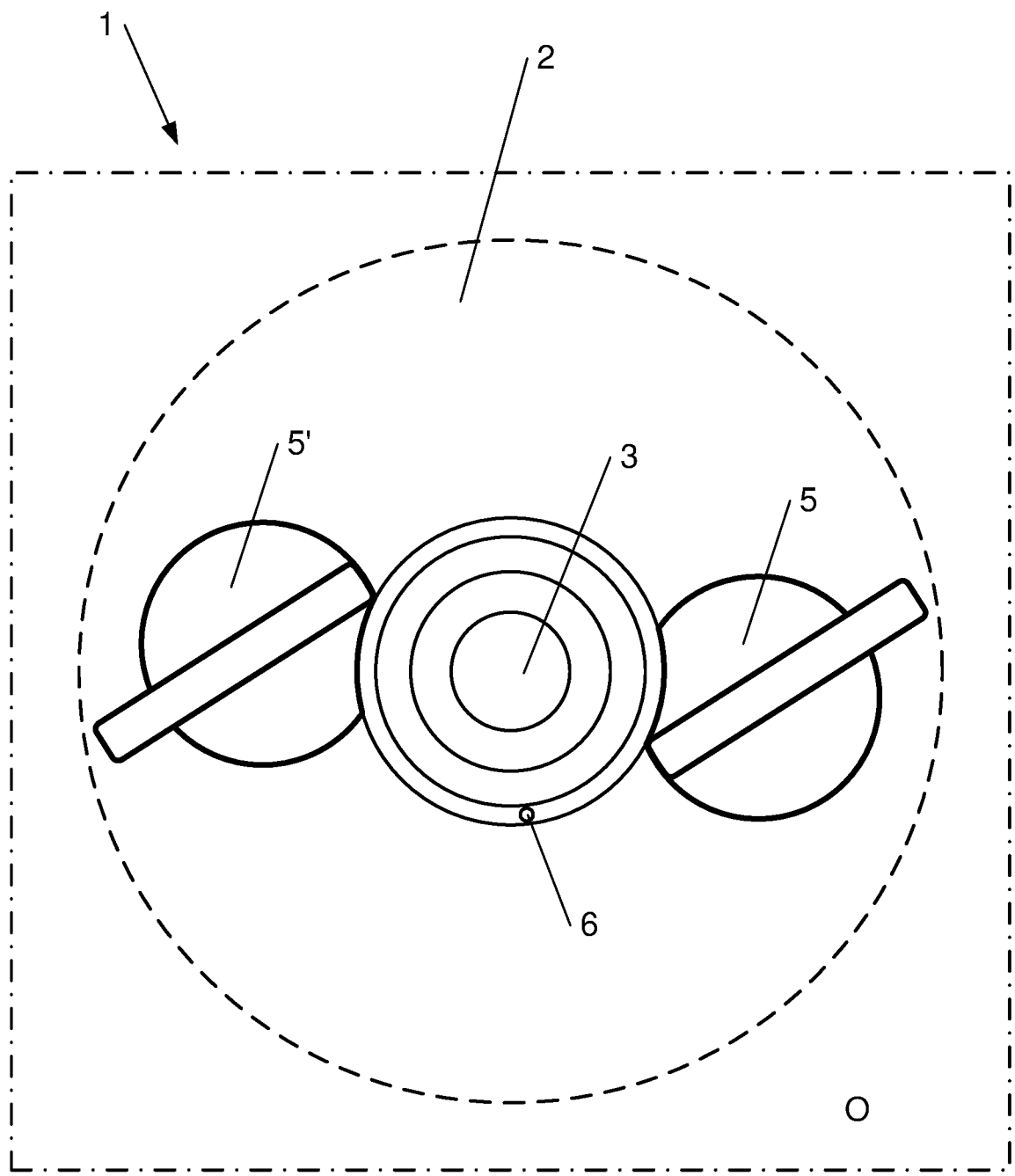
FIG. 1 is a front view, on the side of the environment outside the compartment, and illustrates a first configuration of the connection system in which the communication surface of the connection system is ready to receive a connecting element.

FIG. 1 illustrates a first configuration of a connection system 1 on the side of the environment outside the compartment O, according to which, at a connecting wall 2 of the compartment, there is a communication orifice 3 ready to receive a connecting element 4. As shown on FIG. 4. Connecting element 4 is illustrated on FIG. 4. According to this embodiment, two control elements 5, 5' are present that are in the open position so that the connecting element 4 can be inserted into the communication orifice 3. These two control elements 5, 5' are each part of a blocking device 8, 8' (see FIG. 2). Optionally, on the periphery of the communication orifice 3, there is a lug 6 (protrusion) arranged to prevent the connecting element 4 from rotating during the removal (or replacement) of the removable closing device.

Figure 2:
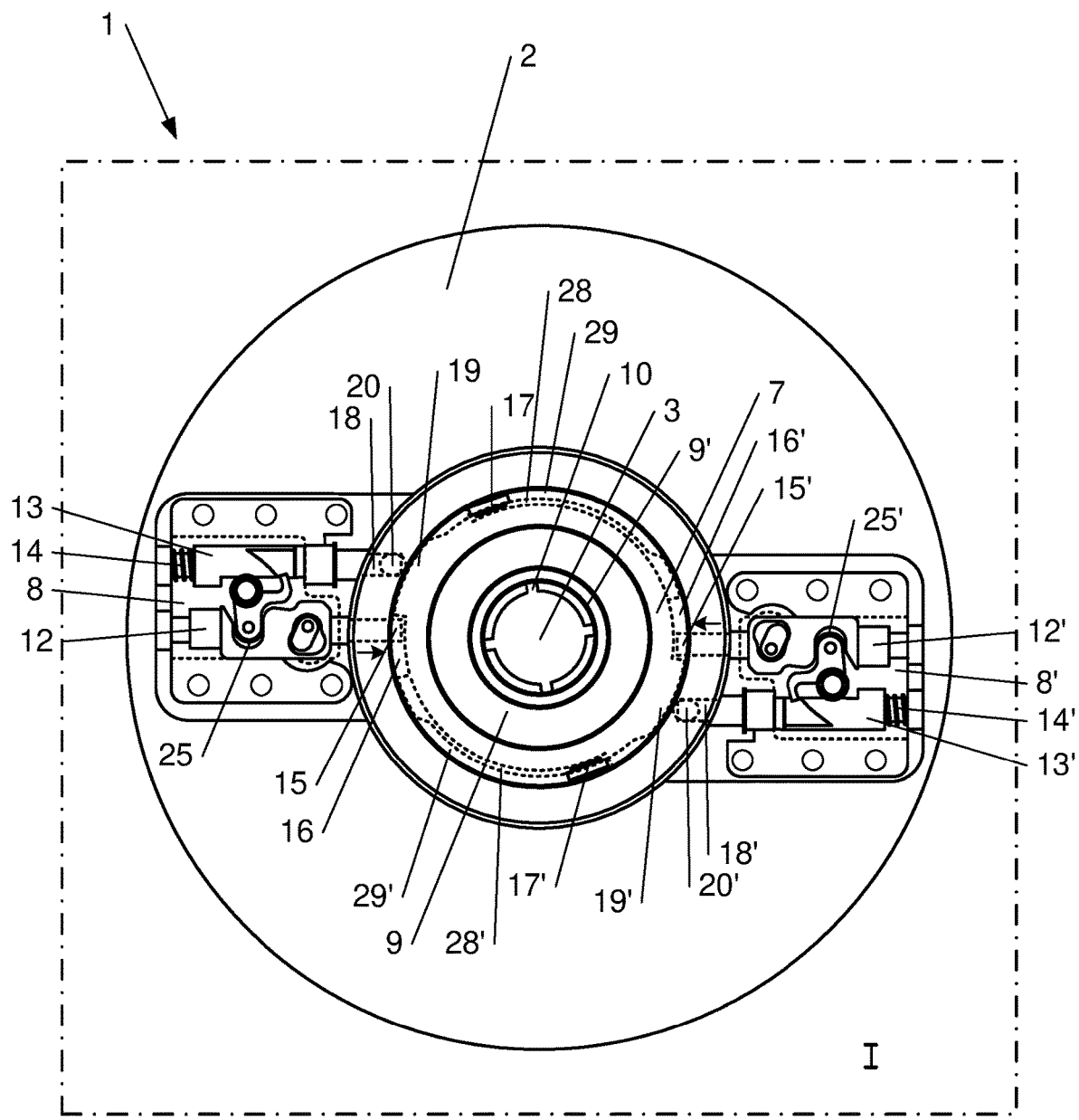
FIG. 2 is a front view, on the side of the environment inside the compartment, and illustrates a first configuration of the connection system identical to that of FIG. 1 in which the communication surface of the connection system is ready to receive a connecting element.

FIG. 2 illustrates, for the same configuration as that illustrated in FIG. 1, the connection system 1 on the side of the inside environment of the compartment I. As illustrated, the connection system 1 comprises a removable closing device 7 (see FIG. 9) and two blocking devices 8, 8'.

The removable closing device 7 (see FIG. 9) comprises a head 9 and a central tubing 9' extending from the head 9 toward the inside of the compartment. This central tubing 9' has inner grooves 10 arranged to receive longitudinal protrusions present on the case 11 mounted on the main body 40 of the connecting element 4. The engagement of the protrusions of the case 11 in the grooves 10 of the removable closing device 7 allows the latter to ensure simultaneous removal of the case 11 during its own removal from the inside of the compartment.

According to the embodiment illustrated in FIG. 2, the removable closing device 7 is kept in tight contact against the connecting wall 2 on the inner side of the compartment while being blocked by two protrusions 17, 17' initially having served as a guide to engage the removable closing device 7 in an engagement device (not shown) extending from the connecting wall 2 toward the inner side of the compartment. More particularly, notches 16, 16' present on the surface of the head 9 of the removable closing device 7 are arranged to engage on the protrusions 17, 17' present on the inner surface of the engagement device. The protrusions 17, 17' therefore initially serve as guides for the notches 16, 16', which makes it possible to position the removable closing device 7 correctly before imparting a rotational movement to the latter (so as to perform screwing by performing a rotational movement to the right), after which the protrusions 17, 17' will block it sealably at the engagement device against the connecting wall 2.

Figure 3:
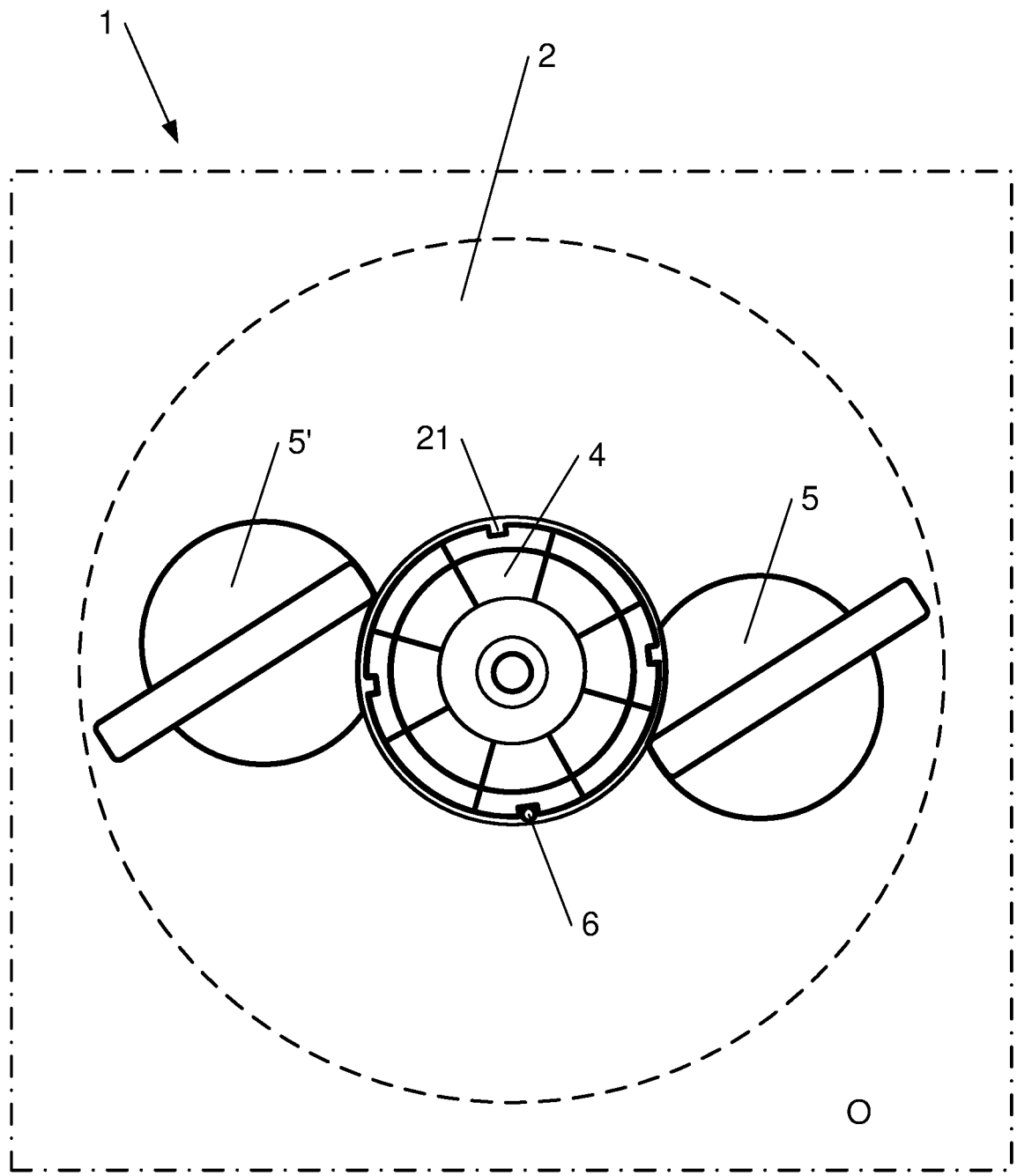
FIG. 3 is a front view, on the side of the environment outside the compartment, and illustrates a second configuration of the connection system in which a connecting element is inserted into the communication orifice.
Figure 4:
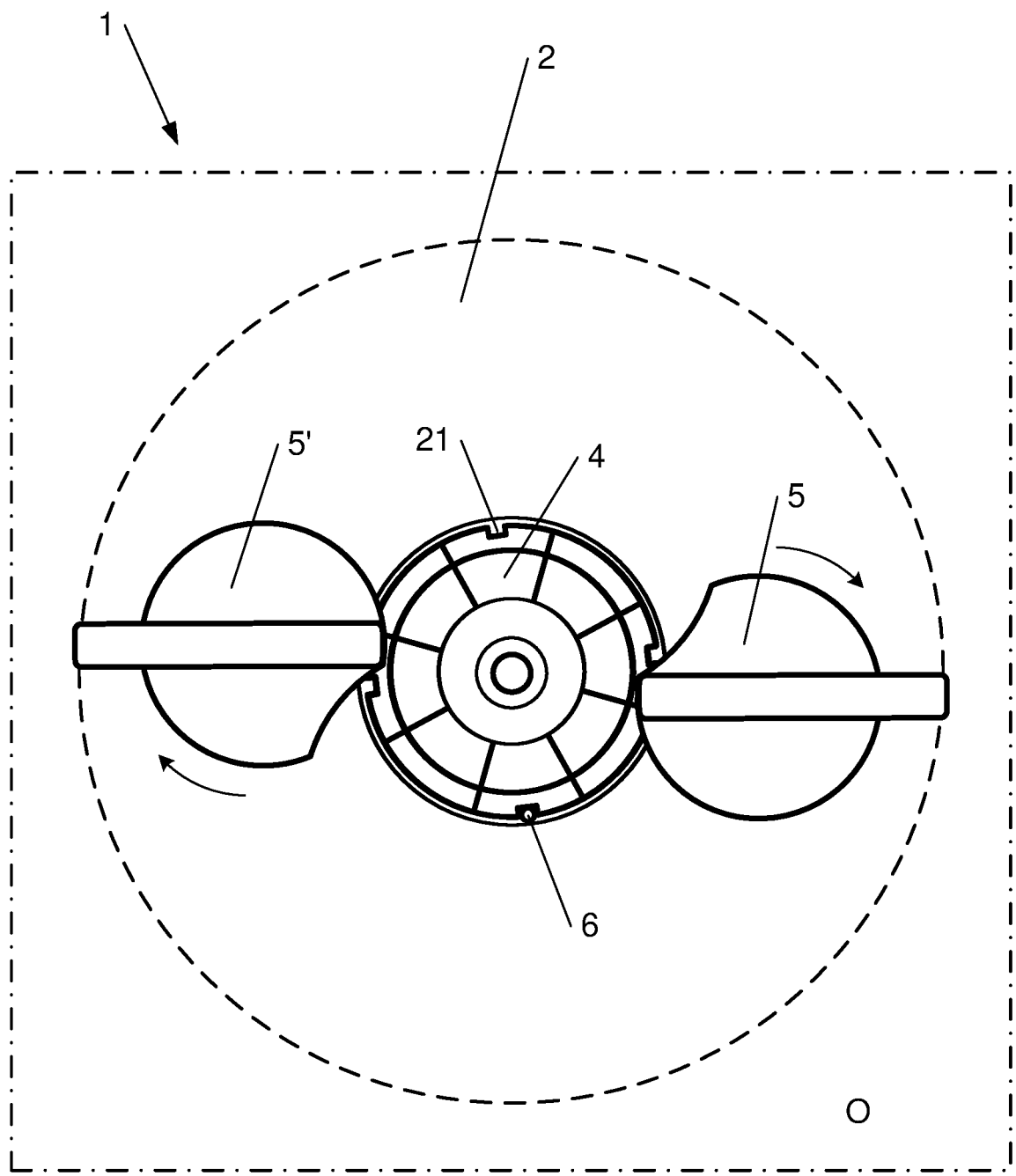
FIG. 4 is a front view, on the side of the environment outside the compartment, and illustrates a third configuration of the connection system in which the connecting element is blocked against the connecting wall by control elements.

Each of the blocking devices 8, 8' comprises the following elements:
- at the connecting wall 2 on the outside environment side O, a control element 5, 5' (as illustrated in FIGS. 1, 3 and 4), which has a first open position (as illustrated in FIGS. 1 and 3) and a second closed position (as illustrated in FIG. 4),
- on the inside environment side, a first blocking element 12, 12', a translational movement of which is controlled by the control element 5, 5', and
- on the inside environment side, a second blocking element 13, 13' comprising a spring 14, 14' and also able to perform a translational movement independent of that done by the first blocking element 12, 12'.

According to the configuration illustrated in FIG. 2, i.e., according to the configuration in which the removable closing device 7 is in place and sealably blocked against the connecting wall 2 and in which the communication orifice 3 of the connection system 1 and the central tubing 9' of the removable closing device 7 are ready to receive a connecting element 4, one end 15, 15' of the first blocking element 12, 12' is engaged in a notch 16, 16' present on the surface of the head 9 of the removable closing device 7. In parallel, as illustrated in FIG. 1, the control element 5 is in the open position to allow the insertion of the connecting element 4 into the communication orifice 3, as well as into the central tubing 9' of the removable closing device 7. Since the end 15, 15' of the first blocking element 12, 12' is engaged in the notch 16, 16' of the removable closing device 7, any unscrewing movement of the latter is prevented, since the edges (walls) of the notch 16, 16' will abut against the end 15, 15' of the first blocking element 12, 12'.

Still according to the configuration illustrated in FIG. 2, one end 18, 18' of the second blocking element 13, 13' is positioned on a protrusion 19, 19' of the removable closing device 7 such that the spring 14 is compressed. This end 18, 18' of the second blocking element 13, 13' is provided with a caster (roller) 20, 20' bearing, in the configuration according to FIG. 2, on the protrusion 19 of the removable closing device 7.

FIG. 3 illustrates a second configuration of the connection system 1 on the side of the environment outside the compartment O, in which a connecting element 4 is inserted into the communication orifice 3. As illustrated in this figure, a notch 21 present at the connecting element 4 engages at a lug 6 (protrusion) arranged to prevent the connecting element 4 from rotating during the removal (or replacement) of the removable closing device.

FIG. 4 illustrates a third configuration of the connection system 1 on the side of the environment outside the compartment O, in which the connecting element 4 is blocked against the connecting wall 2 by control elements 5, 5'. This blocking of the connecting element 4 is obtained by actuating, by a rotational movement (indicated by the arrows), the control buttons 5, 5', which results on the one hand in securing the connecting element 4 so that it cannot disengage from the communication orifice 3 and the removable closing device 7, and on the other hand in ensuring sealed positioning of the connecting element 4, in particular by crushing it against the seal situated at the communication orifice 3 and the connecting wall 2.

Figure 5:
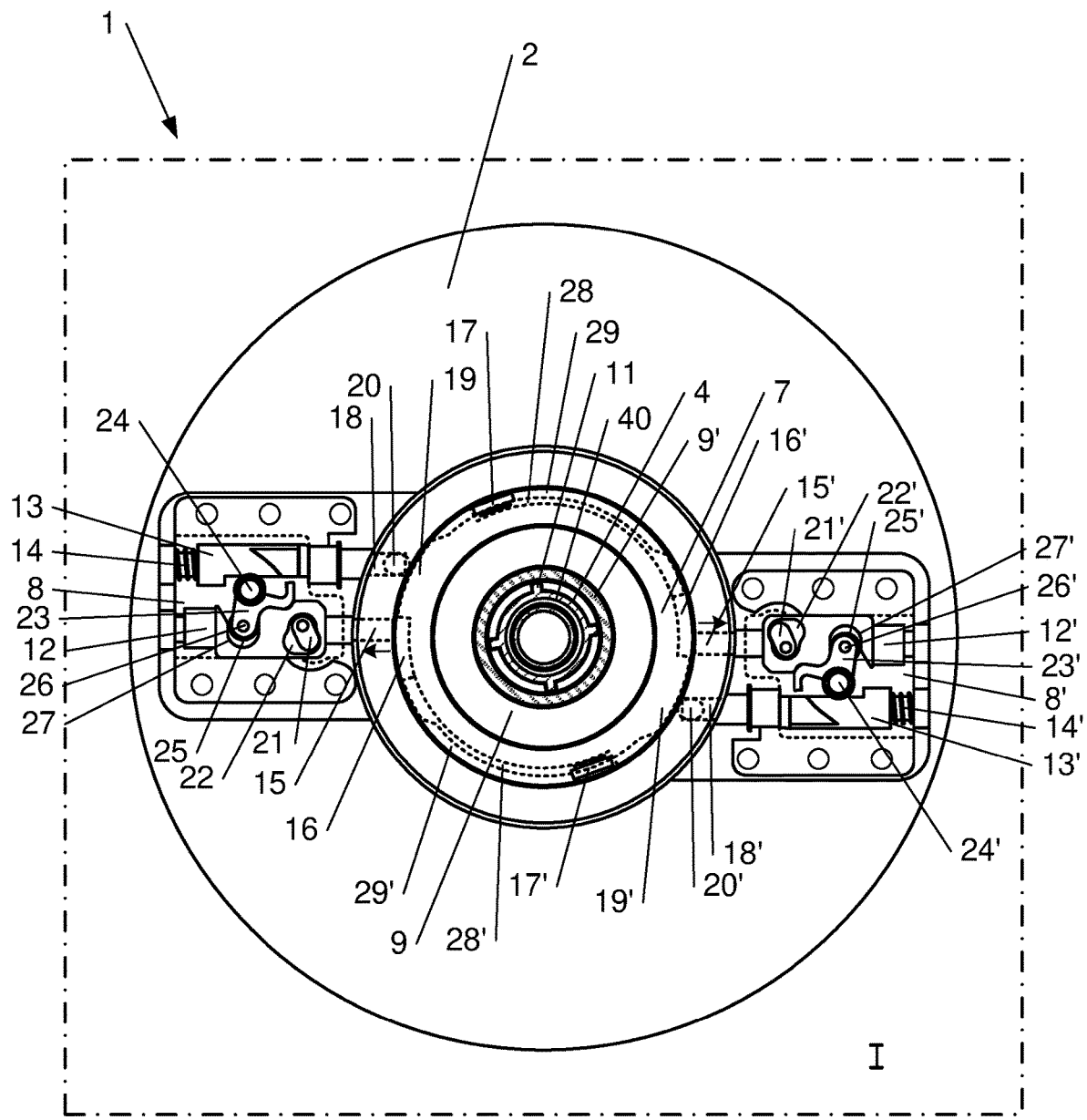
FIG. 5 is a front view, on the side of the environment inside the compartment, and illustrates a third configuration of the connection system identical to that of FIG. 4 in which the connecting element is blocked against the connecting wall by control elements.

FIG. 5 illustrates, for the same configuration as that illustrated in FIG. 4, the connection system 1 on the side of the inside environment of the compartment I. The connecting element 4 is inserted into the communication orifice 3 and into the removable closing device 7, in particular in the central tubing 9' of the latter, inner grooves 10 of the central tubing 9' receiving longitudinal protrusions present on the case 11 mounted on the main body 40 of the connecting element 4.

As illustrated, actuating the control buttons 5, 5' results in retracting the end 15, 15' of the first blocking element 12, 12' along a translational movement (in the direction indicated by the arrows) such that it leaves the notch 16, 16' present on the surface of the head 9 of the removable closing device 7. Consequently, the removable closing device 7 is released and can be manipulated in order to remove it from the inside of the compartment such that the case of the connecting element 4 is removed at the same time. In this configuration, the second blocking element 13, 13' has not yet moved: one end 18, 18' of the second blocking element 13, 13' is positioned on a protrusion 19, 19' of the removable closing device 7 such that the spring 14 is compressed.

The translational movement of the first blocking element 12, 12' is obtained by actuating the control element 5, 5', which will cause a cam 21, 21' to move in its housing 22, 22'. This movement of the cam 21, 21' in its housing 22, 22' will not only allow the end 15, 15' of the first blocking element 12, 12' to be removed from the notch 16, 16', but will also cause a rotational movement of a pivoting element 23, 23' around its axle 24, 24' connected to the connecting wall 2, by driving the rotating roller 25, 25' mounted on an axle 26, 26' secured to said pivoting element, in a cavity 27, 27'.

Figure 6:
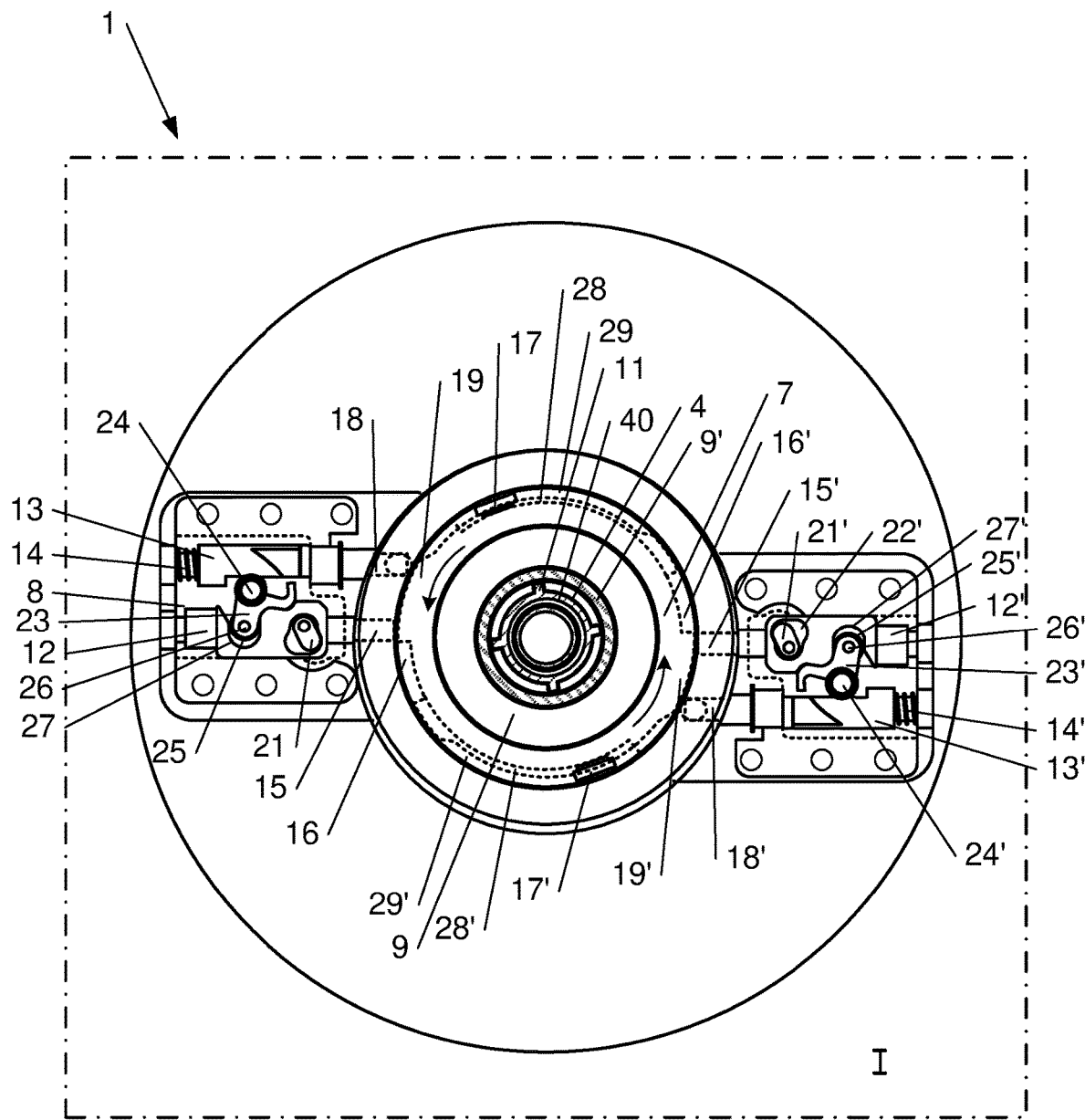
FIG. 6 is a front view, on the side of the environment inside the compartment, and illustrates a fourth configuration of the connection system in which a rotational movement of the removable closing device is initiated.

FIG. 6 illustrate a fourth configuration of the connecting system 1 according to which the removable closing device 7 begins a rotational movement (in the counterclockwise direction as illustrated by the arrows) done so as to cause it to be removed from the inside of the compartment I at the same time as the case 11 mounted on the main body 40 of the connecting element 4. At the head part 9, the inner closing device 7 has notches 16, 16', protrusions 19, 19', slots 28, 28' and ramps 29, 29'. This initial rotational movement has the result that, at the beginning of rotation, the protrusion 19, 19' of the removable closing device 7 is found across from the end 15, 15' of the first blocking element 12, 12' previously retracted during the actuation of the control element 5, 5' to obtain its closed position. Once this end 15, 15' of the first blocking element 12, 12' is across from the protrusion 19, 19' of the removable closing device 7, this protrusion 19, 19' constitutes a stop against which the end 15, 15' of the first blocking element 12, 12' is blocked, which makes any translational movement by this first blocking element 12, 12' impossible and therefore blocks the control element5, 5' in its closed position. As a result, the connecting element 4 is therefore secured at the connecting wall 2 on the outside environment side O and it is impossible, for example via a manipulation error, to transition the control element 5, 5' from its closed position to its open position: this therefore guarantees that the connecting element 4 remains sealably in place and indeed ensures the sterility of the inside environment of the compartment once the removable closing device 7 begins a rotational movement in order to be removed from the inside of the compartment.

When a rotational movement of the removable closing device 7 is started, the end 18, 18' of the second blocking element 13, 13' is in turn still located on the protrusion 19 of the removable closing device 7.

Figure 7:
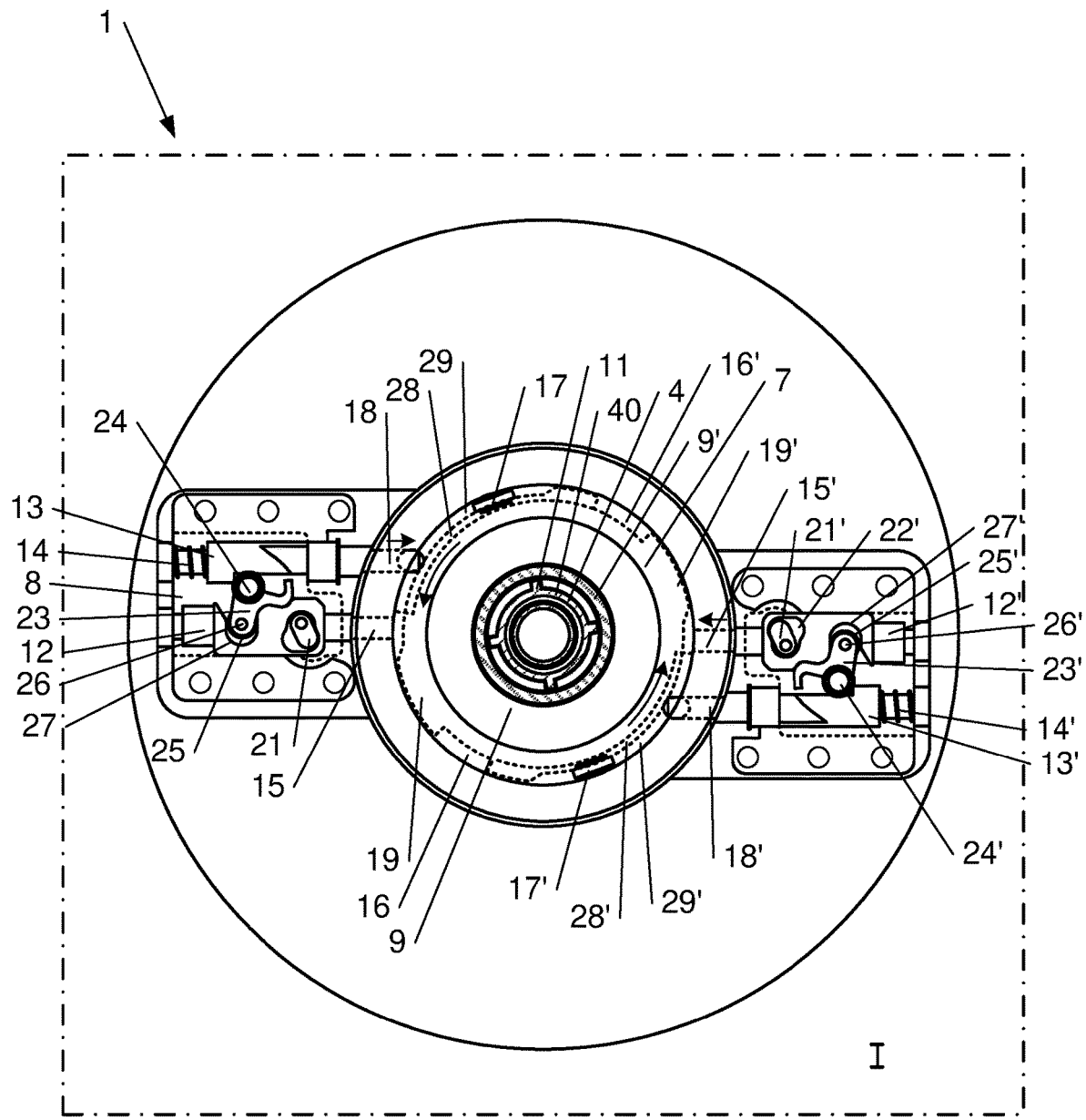
FIG. 7 is a front view, on the side of the environment inside the compartment, and illustrates a fifth configuration of the connection system in which the rotational movement of the removable closing device is continued.

FIG. 7 illustrate a fifth configuration of the connecting system 1 according to which the removable closing device 7 continues it rotational movement (in the counterclockwise direction as illustrated by the arrows) done so as to cause it to be removed from the inside I of the compartment at the same time as the case mounted on the main body 40 of the connecting element 4. At the head part 9, the inner closing device 7 has notches 16, 16', protrusions 19, 19', slots 28, 28' and ramps 29, 29'. As illustrated, since the removable closing device 7 continues its rotational movement by unscrewing, at a given moment, the end 15, 15' of the first blocking element 12, 12' is no longer across from the protrusion 19, 19' of the removable closing device 7. As of this moment, since the protrusion 19, 19' of the removable closing device 7 no longer constitutes a stop for the end 15, 15' of the first blocking element 12, 12', it would be possible to actuate the control element 5, 5', and the potential risk of disengagement of the connecting element 4 at the communication orifice 3 would be observed, for example in case of manipulation error of the connecting system 1. Indeed, if an operator switched the control element 5, 5' from its closed position to its open position at that moment, a disengagement of the connecting element 4 would be possible and would compromise the sealing of the compartment. However, according to the invention, before the protrusion 19, 19' of the removable closing device 7 no longer constitutes a stop for the end 15, 15' of the first blocking element 12, 12', the second blocking element 13, 13' takes over to ensure that the control element 5, 5' is indeed kept in its closing position. Indeed, according to the configuration illustrated in FIG. 7, at the moment when the protrusion 19, 19' of the removable closing device 7 no longer constitutes a stop for the end 15, 15', the end 18, 18' of the second blocking element 13, 13' is already no longer on the protrusion 19, 19' of the removable closing device 7, but indeed in a ramp 29, 29' of the removable closing device 7. Indeed, since the end 18, 18' is no longer bearing on the protrusion 19, 19' of the removable closing device 7, the spring 14, 14' relaxes, pushes and maintains this end 18, 18' in the ramp 29, 29'. A translational movement occurs of the second blocking element (as illustrated by the arrows), such that a solid part P of the second blocking element 13, 13' is found across from an end 30, 30' of the pivoting element 23, 23'. This solid part P of the second blocking element 13, 13' then constitutes a stop for this end 30, 30' of the pivoting element 23, 23', which makes a translational movement impossible of the first blocking element 12, 12', and therefore any movement of the control element 5, 5', which indeed continues to provide sealing of the compartment when the removable closing device 7 continues a rotational movement in order to be removed from the inside of the compartment.

Figure 8:
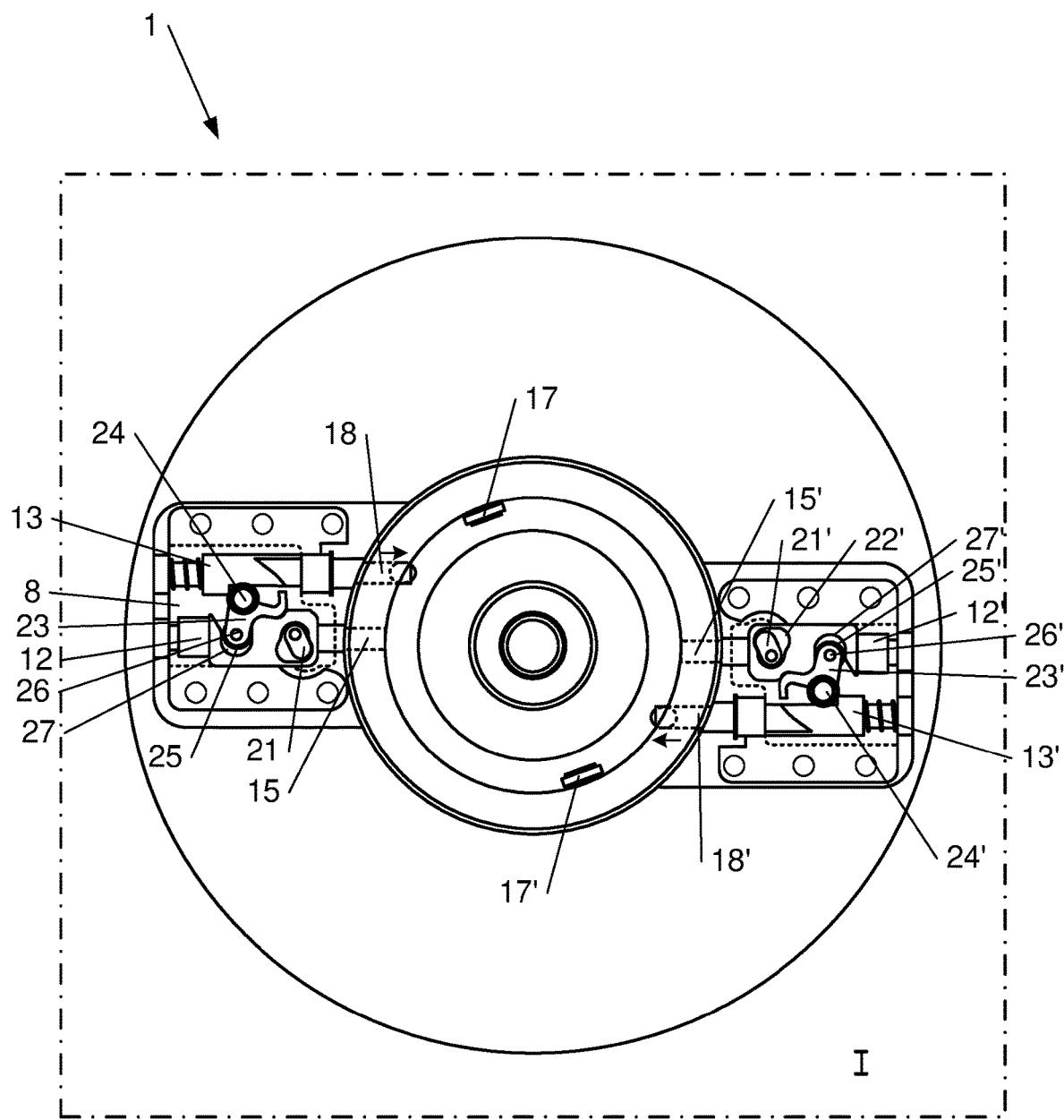
FIG. 8 is a front view, on the side of the environment inside the compartment, and illustrates a six configuration of the connection system in which the removable closing device has been removed.

FIG. 8 illustrate a sixth configuration of the connecting system 1 according to which the removable closing device 7 has been removed from the inside of the compartment I at the same time as the case 11 mounted on the main body 40 of the connecting element 4. As illustrated, the second blocking element 13, 13' makes it possible to ensure that any movement of the control element 5, 5' is impossible, which contributes, as indicated above, to ensuring the sterility of the inside environment of the compartment I when the removable closing device 7 is removed.

Figure 9:
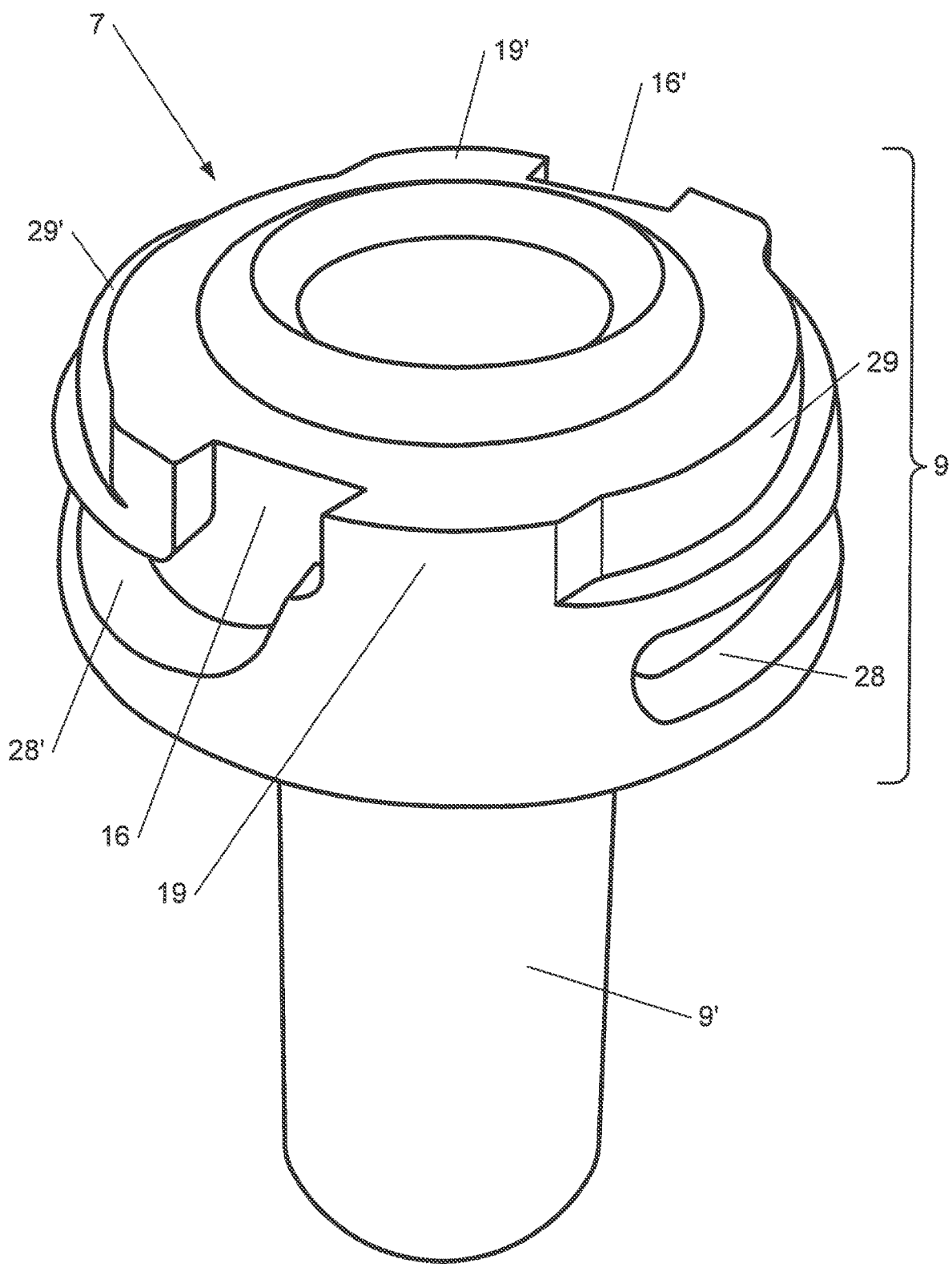
FIG. 9 illustrates an inner closing device according to the invention.
Figure 10:
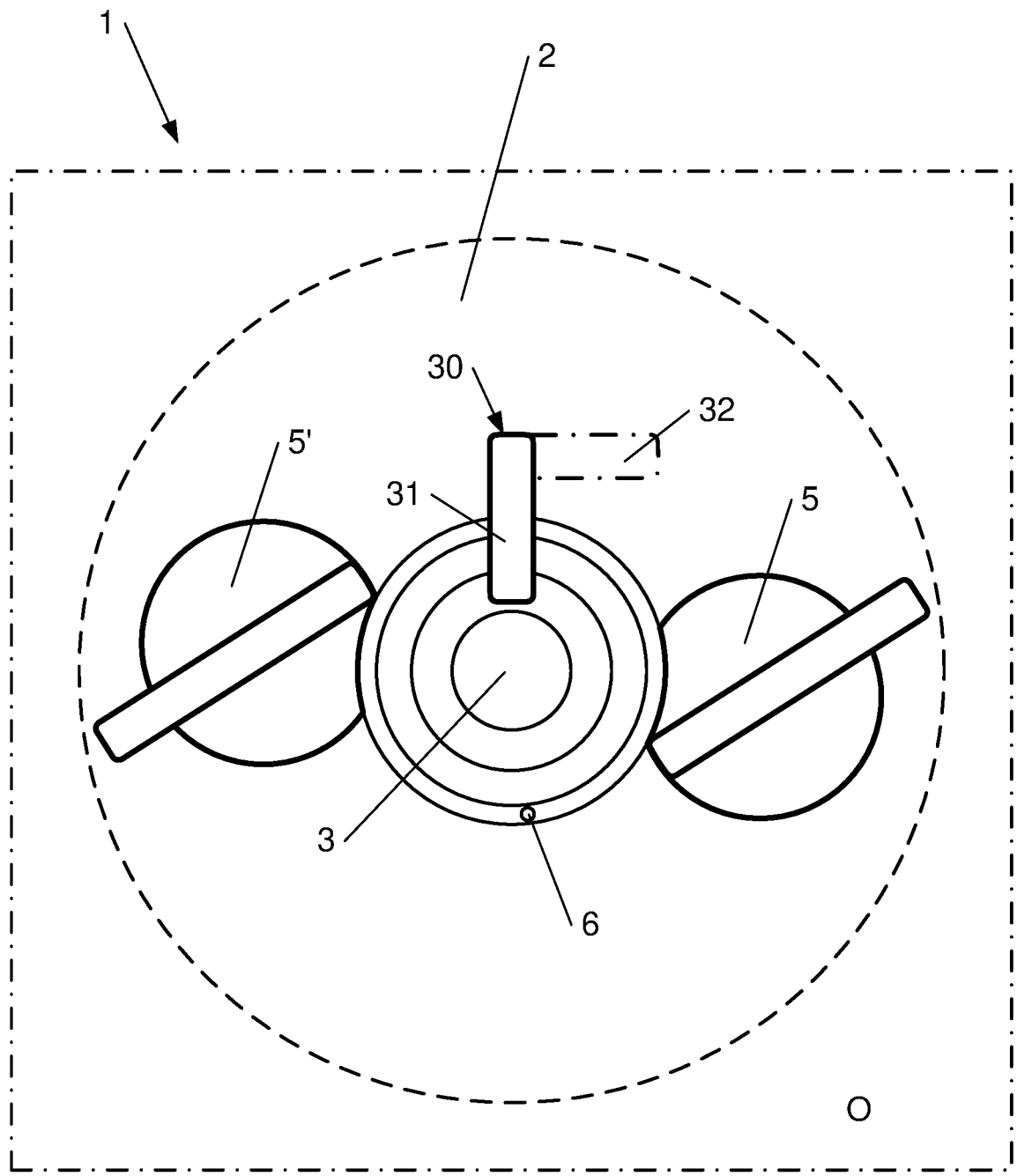
FIG. 10 is a front view, on the side of the environment outside the compartment, and illustrates an alternative embodiment of the connection system comprising said additional blocking device.

FIG. 9 illustrates an inner closing device 7 according to the invention. This inner closing device 7 comprises a head part 9 and a central tubing 9' arranged to receive a connecting element 4. At the head part 9, the inner closing device 7 has notches 16, 16', protrusions 19, 19', slots 28, 28' and ramps 29, 29'.

It is clearly understood that the present invention is in no way limited to the embodiments described above, and that changes may be made thereto without going beyond the scope of the appended claims.

For example, although the figures here illustrate the removal of the inner closing device, of course the present invention also covers repositioning of this inner closing device, the sequence of steps carried out simply being reversed.

The invention claimed is:

1. A connection system for connecting an inside environment of a compartment to an environment outside said compartment, said compartment being isolated relative to the outside environment and the connection system comprising:
   a connecting wall to separate an inside environment from an outside environment, said connecting wall having a communication orifice arranged to receive a through connecting element having a main body on which a case is removably mounted; and
   an inner removable closing device inside said compartment arranged to tightly seal said the communication orifice of said compartment, arranged to be able to be coupled separately with said case mounted on said main body of said through connecting element and arranged such that, when it is removed from the inside of the compartment, it allows a simultaneous removal of said case by separating it from said main body of said through connecting element;
   said connection system being characterized in that it further comprises a blocking device, said blocking device comprising, at said connecting wall on an outside environment outer side, a mechanical control element assuming a form of a control button for controlling a blocking mechanism, said control element defining a first open position to allow said through connecting element to be inserted into said communication orifice and into said inner removable closing device and to control said blocking mechanism so that it blocks any movement by said inner removable blocking device, and a second closing position to block said through connecting element received in said communication orifice at said connecting wall on the outer side and to allow said blocking mechanism to authorize a movement of said inner removable closing device;
   wherein said blocking mechanism is arranged to block said control element in the closed position once a movement has been initiated to remove said inner removable closing device, and maintain said blocking movement of said control element in the closed position during a continuation of said movement to remove said inner removable closing device, up to and including its complete removal.

2. The connection system according to claim 1, characterized in that said blocking mechanism of said blocking device comprises:
   a first blocking element arranged to perform a first blocking of said control element in the closed position once a movement has been initiated to remove said inner removable closing device; and
   a second blocking element arranged to maintain said blocking movement of said control element in the closed position during a continuation of said movement to remove said inner removable closing device, up to and including its complete removal.

3. The connection system according to claim 2, characterized in that said first blocking element comprises a housing arranged to accommodate a cam that is arranged to be actuated by said control element so as to impose a translational movement on said first blocking element.

4. The connection system according to claim 2, characterized in that said first blocking element further comprises a pivoting element having a free end rotating around an axle, said pivoting element being arranged to perform a rotational movement during a translational movement of said first blocking element.

5. The connection system according to claim 2, characterized in that said second blocking element comprises a spring arranged to impose a return movement on the second blocking element.

6. The connection system according to claim 2, characterized in that said second blocking element has a free end provided with a caster.

7. The connection system according to claim 1, characterized in that it further comprises:
   an additional blocking device arranged so as, in a first idle position, to ensure additional blocking for said inner removable closing device and prevent an insertion of said through connecting element into said communication orifice, and so as, in a second position, to be pushed back to allow said through connecting element to be inserted into said communication orifice and unblock said additional blocking of said inner removable closing device.

8. An inner removable closing device of a connection system according to claim 1, said inner removable closing device comprising:
   a head part having a central through orifice; and
   a tubing extending from said head part in the extension of said central through orifice;
   said head part comprising, on a perimeter:
   a protrusion situated at a first level;
   a ramp extending said protrusion, said ramp situated at a second level that is lower than said first level; and
   a notch arranged to provide access to a slot, said slot situated at a level that is lower than said second level.

9. The connection system according to claim 1, wherein the control button is a rotating control button.

10. A method for connecting an inside environment of a compartment to an environment outside said compartment, said method comprising the steps of:
   inserting, via a communication orifice of a connecting wall separating an inner environment from an outer environment, a connecting element having a main body that enables the connecting element to be engaged in an inner removable closing device that is previously positioned and blocked so as to tightly seal said communication orifice;
   actuating a mechanical control element assuming a form of a control button situated on an outside environment outer side to position it in the closing position in order to secure and block said connecting element against said connecting wall at said communication orifice and so as to unblock said inner removable closing device and allow a removal movement thereof;

setting said inner removable closing device in motion to allow the inner removable closing device to be removed from the inside of said compartment simultaneously with a removal of a case protecting said main body of said connecting element;

said step for setting said inner removable closing device in motion generating the steps of:

blocking said mechanical control element in the closed position via a blocking mechanism once said inner removable closing device begins a removal movement; and maintaining said blocking of said mechanical control element in the closed position via said blocking mechanism once said inner removable closing device continues a removal movement, up to and including its complete removal.

11. The connection method according to claim 10, characterized in that said blocking of said control element in the closed position is done via a first blocking element of said blocking mechanism, one end of said first blocking element abutting against a protrusion of said inner removable closing device having begun its removal movement.

12. The connection method according to claim 11, characterized in that said blocking of said control element in the closed position is maintained via a second blocking element of said blocking mechanism, said second blocking element blocking said first blocking element.

13. The connection method according to claim 10, further comprising:

deactivating an additional blocking device from a first idle position to a second position, said additional blocking device being arranged to block said inner removable closing device in the absence of said connecting element.

14. The connection method according to claim 10, further comprising:

transfering a fluid or powder via the communication orifice.

* * * * *